United States Patent
Coddington

(10) Patent No.: US 10,268,604 B2
(45) Date of Patent: Apr. 23, 2019

(54) ADAPTIVE RESOURCE MANAGEMENT IN A PIPELINED ARBITER

(71) Applicant: Oracle International Corporation, Redwood City, CA (US)

(72) Inventor: John Deane Coddington, Cedar Park, TX (US)

(73) Assignee: Oracle International Corporation, Redwood City, CA (US)

( * ) Notice: Subject to any disclaimer, the term of this patent is extended or adjusted under 35 U.S.C. 154(b) by 341 days.

(21) Appl. No.: 14/795,389

(22) Filed: Jul. 9, 2015

(65) Prior Publication Data

US 2017/0010986 A1  Jan. 12, 2017

(51) Int. Cl.
  *G06F 13/36* (2006.01)
  *G06F 13/16* (2006.01)
  *G06F 13/28* (2006.01)
  *G06F 9/50* (2006.01)

(52) U.S. Cl.
  CPC ........ *G06F 13/1642* (2013.01); *G06F 9/5022* (2013.01); *G06F 13/28* (2013.01)

(58) Field of Classification Search
  CPC ..... G06F 13/1642; G06F 13/28; G06F 9/5022
  USPC ........................................................ 710/308
  See application file for complete search history.

(56) References Cited

U.S. PATENT DOCUMENTS

| | | | |
|---|---|---|---|
| 5,412,788 A | 5/1995 | Collins et al. | |
| 5,987,574 A | 11/1999 | Paluch | |
| 6,584,531 B1 | 6/2003 | Singh | |
| 7,149,139 B1 * | 12/2006 | Rosen | G06F 5/16 365/221 |
| 2001/0042178 A1 | 11/2001 | Achilles et al. | |
| 2002/0188811 A1 | 12/2002 | Ma et al. | |
| 2006/0095634 A1 | 5/2006 | Meyer | |
| 2008/0235707 A1 | 9/2008 | Gwilt et al. | |
| 2008/0256279 A1 | 10/2008 | Kethareswaran et al. | |
| 2010/0312990 A1 * | 12/2010 | Walker | G06F 13/1663 712/29 |
| 2011/0218004 A1 * | 9/2011 | Catovic | H04W 48/02 455/509 |
| 2012/0271976 A1 | 10/2012 | Zhu et al. | |

\* cited by examiner

*Primary Examiner* — Chun Kuan Lee
(74) *Attorney, Agent, or Firm* — Robert C. Kowert; Meyertons, Hood, Kivlin, Kowert & Goetzel, P.C.

(57) ABSTRACT

A resource arbiter in a system with multiple shared resources and multiple requestors may implement an adaptive resource management approach that takes advantage of time-varying requirements for granting access to at least some of the shared resources. For example, due to pipelining, signal timing issues, or a lack of information, more resources than are required to perform a task may need to be available for allocation to a requestor before its request for the needed resources is granted. The requestor may request only the resources it needs, relying on the arbiter to determine whether additional resources are required in order to grant the request. The arbiter may park a high priority requestor on idle resources, thus allowing requests for those resources by the high priority requestor to be granted on the first clock cycle of a request. Other requests may not be granted until at least a second clock cycle.

20 Claims, 9 Drawing Sheets

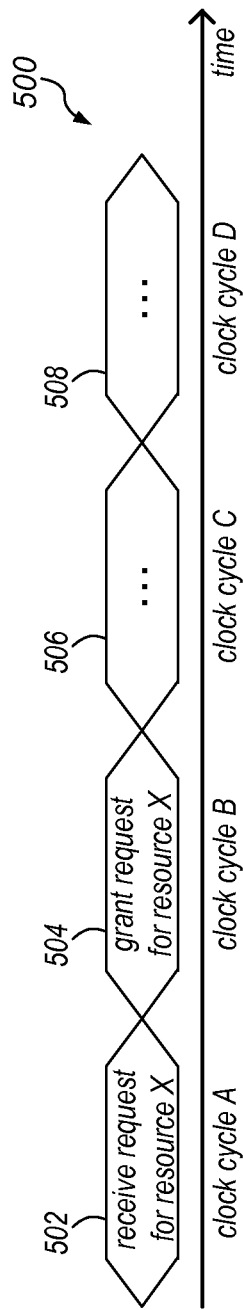
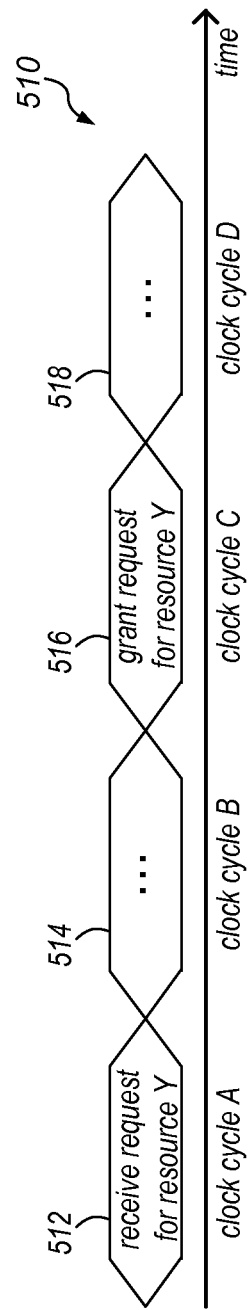
FIG. 5A
FIG. 5B

ADAPTIVE RESOURCE MANAGEMENT IN A PIPELINED ARBITER

BACKGROUND

Field of the Disclosure

This disclosure relates generally to resource management in a computer system, and more particularly to systems and methods for managing access to shared resources in systems in which the resources necessary to perform a given task can vary over time.

Description of the Related Art

Computer systems often include shared resources, each of which can be requested by multiple potential requestors, and a resource manager that arbitrates for access to those shared resources. In some existing systems, access to shared resources is granted on a round robin basis, with none of the requestors having a higher priority than any others when it comes to resource allocation/arbitration decisions. In other systems, the arbiter gives preference to particular ones of the requestors for a given shared resource (e.g., requestors that are designated as having a higher priority for that resource or requestors that assert a high-priority signal indicating that their requests should be higher than those of one or more other requestors).

Because of the nature of clocked computer systems, the resources necessary to perform a task in any given clock cycle can change from cycle to cycle. In some systems, the resources required to perform a task can change with time based on the available data (e.g., based on the data available at any given time due to the timing of various signals or due to other operations that take place at different times during a request/response cycle and on which resource allocation decisions are dependent). For example, some existing systems include a multiple banked memory that is shared among multiple requestors and for which the requirements for granting access to a given memory bank can be different at different times (for at least some of the requestors).

In some existing systems, the maximum possible resource requirements are always used to make allocation/arbitration decisions, without taking advantage of the time-varying nature of the resource requirements. In these systems, a typical approach is to require that the requestor requests the maximum resource requirements that could possibly be needed during any clock cycle and to only allow the task to proceed when those maximum resource requirements are met. This can result in resources that are not actually needed by a given requestor being unavailable to other requestors during at least some clock cycles (e.g., during at least some of the time between when a request is made and the clock cycle during which the request is granted).

SUMMARY

In various embodiments, the systems described herein may include a resource arbiter that makes decisions about how to allocate shared resources, each of which may have multiple requestors. The arbiter may employ an adaptive resource management approach that takes advantage of time-varying requirements for granting access to at least some of the shared resources. For example, due to pipelining, signal timing issues, and/or a lack of information, more resources than are required to perform a task may need to be available for allocation to a given one of the requestors before its request for the needed resources can be granted. However, the requestor may not need to understand the time-varying requirements for granting its request, but may only need to request the resources it needs, relying on the arbiter to determine whether additional resources are required in order to grant the request at a particular time.

In some embodiments, in response to receiving a request for a particular portion of the shared resources in a system, the resource arbiter may be configured to determine whether or not the resources whose availability is required in order to grant the request during a particular clock cycle are available during that clock cycle. If so, the arbiter may grant the request during that clock cycle. If not, the arbiter may be configured to determine whether or not the resources whose availability is required in order to grant the request during another (subsequent) clock cycle are available during that other clock cycle. If so, the arbiter may grant the request during the other clock cycle.

In some embodiments, not all of the requestors have access to all of the shared resources that are managed by the resource arbiter. For example, some requestors may only have access to particular ones of multiple shared resources (e.g., one memory bank of a multiple banked memory), while other requestors may have access to all of the shared resources (e.g., all of the memory banks of a multiple banked memory). Therefore, different ones of the shared resources may have different numbers of potential requestors. In some embodiments, the resources required to be available in order to grant a request during particular clock cycles may be dependent on which of the requestors made the request. In addition, in some embodiments, one of the requestors may have a special status or a higher priority than the other requestors with respect to allocation/arbitration decisions.

In some embodiments, the arbiter may park a high priority requestor on idle resources, thus allowing requests for those resources by the high priority requestor to be granted at the first possible opportunity (e.g., on the first clock cycle of a request). Other requests (including those made by other requestors or those made by the high priority requestor at times when not all of the resources that could potentially be needed in order to grant the request at the earliest opportunity are available) may not be granted until a subsequent clock cycle (e.g., not until at least a second clock cycle of the request).

BRIEF DESCRIPTION OF THE DRAWINGS

FIGS. 5A-5E illustrate portions of example timelines during which resource requests are received and granted in different systems, including some that implement the adaptive resource management techniques described herein.

Figure 1:
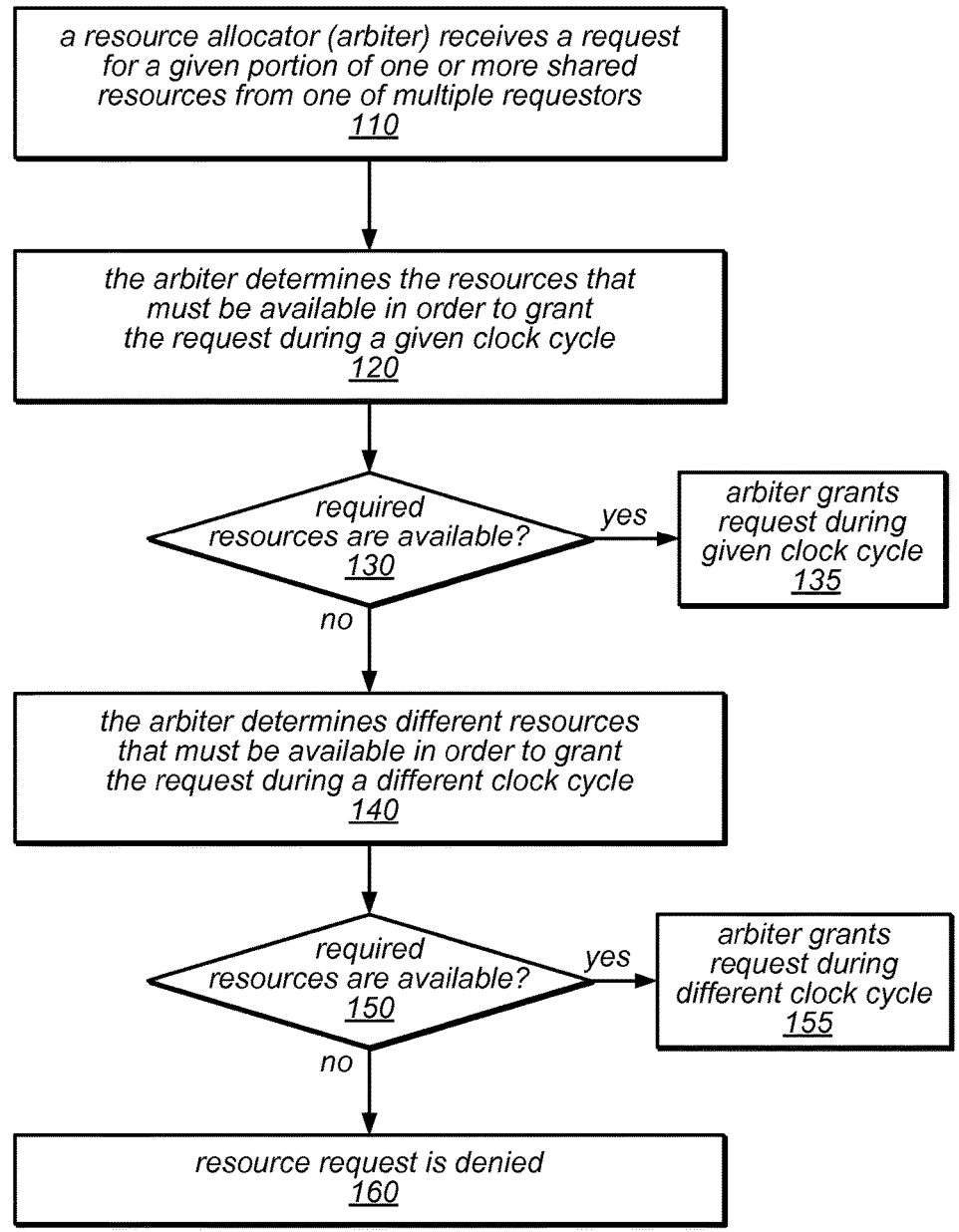
FIG. 1 is a flow diagram illustrating one embodiment of a method for performing adaptive resource management.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, in some clocked computer systems, the resources necessary to perform a particular task during any given clock cycle can change from cycle to cycle. In some cases, this may be dependent on the data that is (or is not) available to one or more system components during a particular cycle and/or on data that becomes available in a subsequent cycle. For example, a resource allocation/arbitration component may receive a request for resources from one of multiple requestors, and may be configured to grant the request, but the number of resources that are required to be available in order to grant the request may be different depending on when the request is granted. In existing clocked computer systems, a typical design practice for addressing such scenarios is to require that a requestor (e.g., another component that requests access to shared resources in order to perform a task) always requests the maximum resource requirements for any of the cycles during which the request can potentially be granted, and to only allow the task to proceed when those maximum requirements are met. In systems in which there are multiple requestors that are always requesting the maximum resources that could (potentially) be required in order for the requests to be granted, the overall performance of the system can suffer.

In some embodiments of the systems described herein, however, a requestor may only need to request the minimum resources that are required to be available in order for the request to be granted in any of the various cycle scenarios (e.g., the actual or minimum number of resources required to perform a given task), and the task may be allowed to proceed based on the per cycle requirements. In different embodiments, this approach may be applied in any of a variety of applications in which the maximum required resource scenario occurs when a request for resources is first made and in which the resource requirements are guaranteed to decrease (to approach the minimum amount required by any cycle) as time progresses. For example, in some embodiments, the mechanisms described herein may be applied when allocating shared resources in situations in which the portion of the shared resources that is required to perform a task diminishes over time from the maximum amount to the minimum amount as more data is (or becomes) available to inform resource allocation decisions. In such embodiments, the overall performance of the system may be improved over existing systems in which multiple requestors always request the maximum resources that may (potentially) be required in order for the requests to be granted.

In some embodiments of the systems described herein, requestors may only need to request the minimum resources that may (potentially) be required to perform a task even though, at the time of the request, there may not be enough data available to the requestor to know that the minimum resources will be sufficient to complete the request at that time. In such embodiments, it may be the job of the resource allocator (arbiter) to handle the time-varied nature of the resource requirements when determining whether and/or when to grant the request. For example, in a system in which, due to tight timing constraints, the requestor does not have enough information to determine whether or not additional resources are needed to perform a task (e.g., more than the minimum amount required to perform the task in any cycle), the arbiter may have access to additional information that allows it to make that determination. In this example, the requestor may request only the minimum required resources, but the arbiter, after having determined that more resources are required in order to grant the request during a particular cycle (e.g., at the first opportunity to do so), may also allocate the additional resources that are required in order grant the request. In various embodiments, the adaptive resource management techniques described herein may allow a resource allocator/arbiter to more effectively allocate shared resources when there are multiple requestors for the shared resources (or portions thereof).

One embodiment of a method for performing adaptive resource management is illustrated by the flow diagram in FIG. 1. As illustrated at 110, in this example, the method may include a resource allocator (arbiter) receiving a request for a given portion of one or more shared resources from one of multiple requestors. The method may include the arbiter determining the resources (e.g., the number and/or type of resources) that must be available in order to grant the request during a given clock cycle, as in 120. If the required resources are available (shown as the positive exit from 130), the method may include the arbiter granting the request during the given clock cycle (as in 135).

If, however, the resources that are required to be available in order to grant the request during the given clock cycle are not available (shown as the negative exit from 130), the method may include the arbiter determining a different set of resources that must be available in order to grant the request during a different clock cycle (as in 140). For example, in some embodiments, more, fewer, and/or different resources (or types of resources) may be required in order to grant the request during a subsequent clock cycle. If the resources that are required to be available in order to grant the request during the other clock cycle are available (shown as the positive exit from 150), the method may include the arbiter granting the request during the other clock cycle (as in 155). However, if the resources that are required to be available in order to grant the request during the other clock cycle are not available (shown as the negative exit from 150), the resource request may be denied (as in 160). Note that, in some embodiments, any or all of the operations illustrated in elements 120-155 of FIG. 1 may be repeated one or more times (e.g., up to a pre-determined maximum number of times) during subsequent clock cycles, with or without a back-off or delay period in between attempts to satisfy the request, in the hope that the arbiter will be able to grant the request. In some such embodiments, the request signal may remain asserted until the request is granted (or denied). In different embodiments, the resource requirements for granting the request may or may not change between each subsequent pair of attempts (e.g., there may be more than two different possible sets of resource requirements for granting the request at different times). For example, the amount of resources required to grant the request on a third or fourth clock cycle may be less than are required to grant the request during the second clock cycle. In this example, if the arbiter is still not able to grant the request, the request may be denied and may need to be resubmitted.

As noted above, in some clocked systems, it may be the case that more resources are required to be available in order to grant a particular request during one clock cycle (e.g., at the first possible opportunity to grant the request after it is received) than in another clock cycle (e.g., a subsequent clock cycle), and this may be dependent on the information that is available at different times. In one specific example, in order to grant a particular request for shared resources at time A, six resources may be required. However, in order to grant the request at time B, only two resources may be required. In this example, a requestor may only need to request the minimum amount of resources needed at any point in time (in this case, two resources). The resource arbiter may, at time A, determine what the time-varying requirements are (e.g., six resources, which may include the two requested resources). If the six resources are available at time A, the arbiter may grant the request at time A. If not, but if the two requested resources are available at time B, the arbiter may grant the request at time B. An advantage of this approach is that in this example, unlike in some existing systems, the maximum resources (e.g., the six resources) do not need to be available in order to grant the request at time B, when two resources will suffice.

In some embodiments, resource allocation decisions made by a resource allocator (arbiter) may be dependent, in part, on which of multiple potential requestors submitted the requests, in addition to being dependent on time-varying resource requirements. In some embodiments, the timing of resource requests and corresponding responses that are exchanged between the arbiter and different requestors may be different, such that different amounts of information usable to inform resource allocation decisions are available at different times (relative to the request being received). For example, in some embodiments (e.g., due to timing issues for various signals being sent from the requestor to the arbiter and/or the pipelining of various requests), an individual requestor may not have enough information to determine the resources that are required in order to be granted their request at a given time (nor to determine when the request is likely to be granted), but the resource arbiter may have access to information that is unavailable to the requestor.

Figure 2:
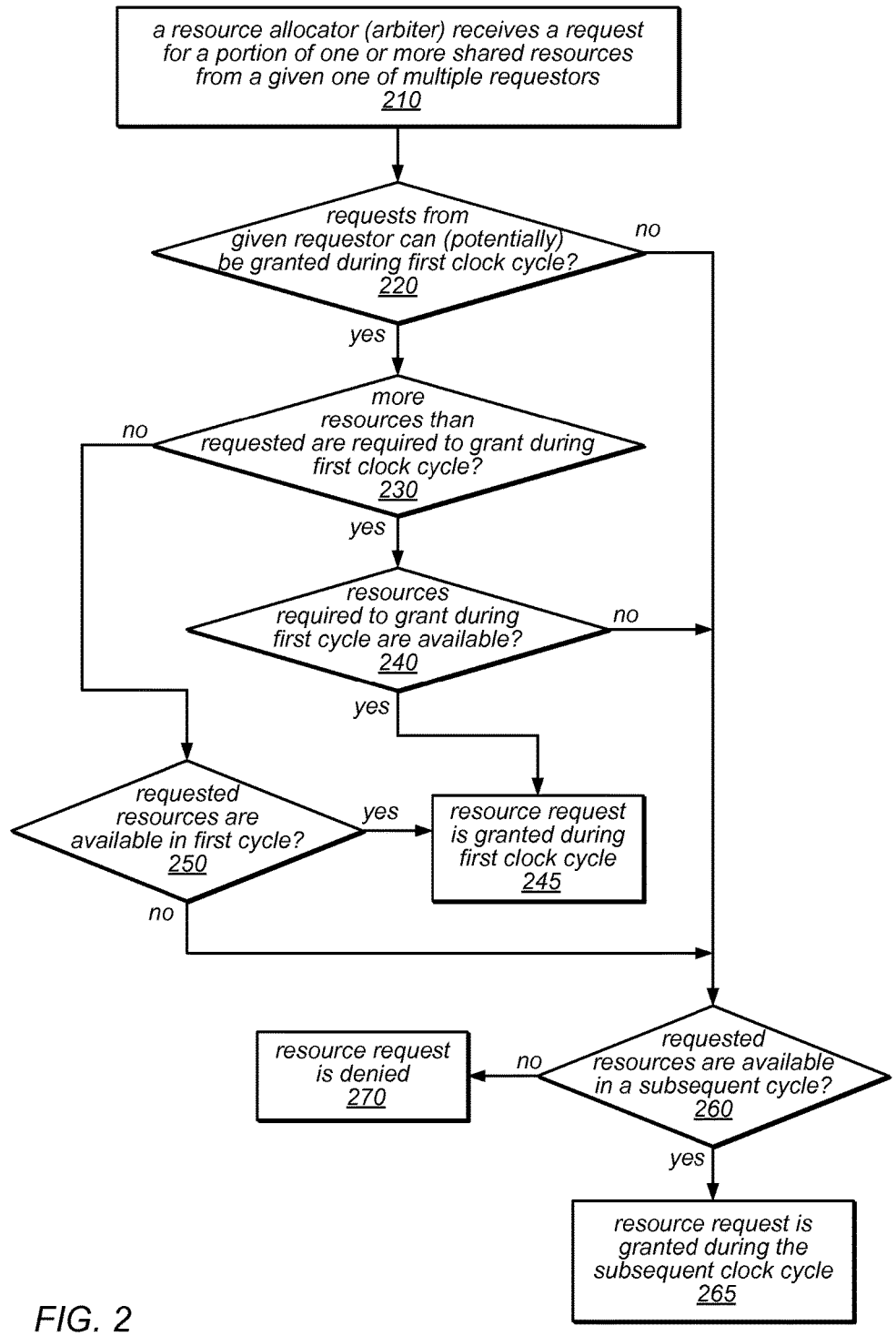
FIG. 2 is a flow diagram illustrating one embodiment of a method for managing resource requests in systems in which more resources than are requested may be required in order to grant a resource request early.

One embodiment of a method for managing resource requests in systems in which more resources than are requested may be required in order to grant a resource request early (e.g., at the first possible opportunity) is illustrated by the flow diagram in FIG. 2. As illustrated at 210, in this example, the method may include a resource allocator (arbiter) receiving a request for at least a portion of one or more shared resources from a given one of multiple requestors. If requests from the given requestor can (potentially) be granted during a first clock cycle (shown as the positive exit from 220), if more resources than those that were requested are required to be available in order to be able to grant the request during the first clock cycle (shown as the positive exit from 230), and if the resources that are required to be available in order to grant the request during the first clock cycle are available (shown as the positive exit from 240), the method may include the arbiter granting the request during the first clock cycle (as in 245).

However, if requests from the given requestor can (potentially) be granted during a first clock cycle (shown as the positive exit from 220), and if more resources than those that were requested are required to be available in order to be able to grant the request during the first clock cycle (shown as the positive exit from 230), but the resources that are required to be available in order to grant the request during the first clock cycle are not available (shown as the negative exit from 240), the method may include determining whether the requested resources (or another amount of resources that is less than the amount required in order to grant the request during the first clock cycle) are available in a subsequent cycle (as in 260). In this case, if the requested resources (or the other amount of resources) are available in a subsequent cycle (shown as the positive exit from 260), the method may include granting the request during a subsequent clock cycle (as in 265). Otherwise, if the requested resources (or the other amount of resources) are not available in a subsequent cycle (shown as the negative exit from 260), the resource request may be denied (as in 270).

As illustrated in this example, if requests from the given requestor can (potentially) be granted during a first clock cycle (shown as the positive exit from 220), if no more resources than those that were requested are required to be available in order to be able to grant the request during the first clock cycle (shown as the negative exit from 230), and if the requested resources are available in the first clock cycle (shown as the positive exit from 250), the method may include granting the request during the first clock cycle (as in 245). However, if requests from the given requestor can (potentially) be granted during a first clock cycle (shown as the positive exit from 220), and if no more resources than those that were requested are required to be available in order to be able to grant the request during the first clock cycle (shown as the negative exit from 230), but the requested resources are not available in the first clock cycle (shown as the negative exit from 250), the method may include determining whether the requested resources are available in a subsequent cycle (as in 260).

Similarly, if requests from the given requestor cannot be granted during a first clock cycle (shown as the negative exit from 220), the method may include determining whether the requested resources (or another amount of resources that is less than an amount that would have been required in order to grant the request during the first clock cycle for one or more other requestors) are available in a subsequent cycle (as in 260). In either case, if the requested resources (or the other amount of resources) are available in a subsequent cycle (shown as the positive exit from 260), the method may include granting the request during a subsequent clock cycle (as in 265). Otherwise, if the requested resources (or the other amount of resources) are not available in a subsequent cycle (shown as the negative exit from 260), the resource request may be denied (as in 270). Note that, in some embodiments, the operation illustrated in element 260 of FIG. 2 may be repeated one or more times (e.g., up to a pre-determined maximum number of times) during subsequent clock cycles, with or without a back-off or delay period in between attempts to satisfy the request, in the hope that the arbiter will be able to grant the request. In such embodiments, if the arbiter is still not able to grant the request, the request may be denied and may need to be resubmitted. In some embodiments, the request signal may remain asserted until the request is granted (or denied). In different embodiments, the resource requirements for granting the request may or may not change between each subsequent pair of attempts (e.g., there may be more than two different possible sets of resource requirements for granting the request at different times). For example, the amount of resources required to grant the request on a third or fourth clock cycle may be less than are required to grant the request during the second clock cycle.

In some embodiments, one or more of the multiple requestors for shared resources in a clocked system may have a higher priority than other ones of the requestors, or may have a special status among the requestors. For example, in some embodiments, it may be beneficial to the performance of the overall system if requests for shared resources that originate from (or on behalf of) a particular requestor that has a higher relative priority than other requestors or that has another type of special status are granted at the first possible opportunity after they are received. In some such embodiments, when no requestor is requesting a particular shared resource (or collection of shared resources), the systems described herein may be configured to award (allocate) those shared resource(s) to the particular requestor (i.e., the requestor that has the higher relative priority or special status). This may be referred to as "parking", and its effect may be to remove a pipeline penalty in an idle system when the particular requestor makes a request. In other words, if the system has parked the particular requestor on a shared resource, it may receive an accept (acknowledging that the request was granted) at the first (potential) opportunity to do so (i.e., without needing to wait until a subsequent cycle), even if the timing of requests/responses for the particular requestor would not normally allow enough information to be available in time to make such a decision during the first possible clock cycle for the response. In some embodiments, the system may be configured to attempt to park the particular requestor on the maximum number of resources that could ever be required in order to grant resource requests in any given cycle (if they are available). This approach (if successful) may allow the arbiter to grant all requests received from the particular requestor at the first opportunity to do so.

Figure 3:
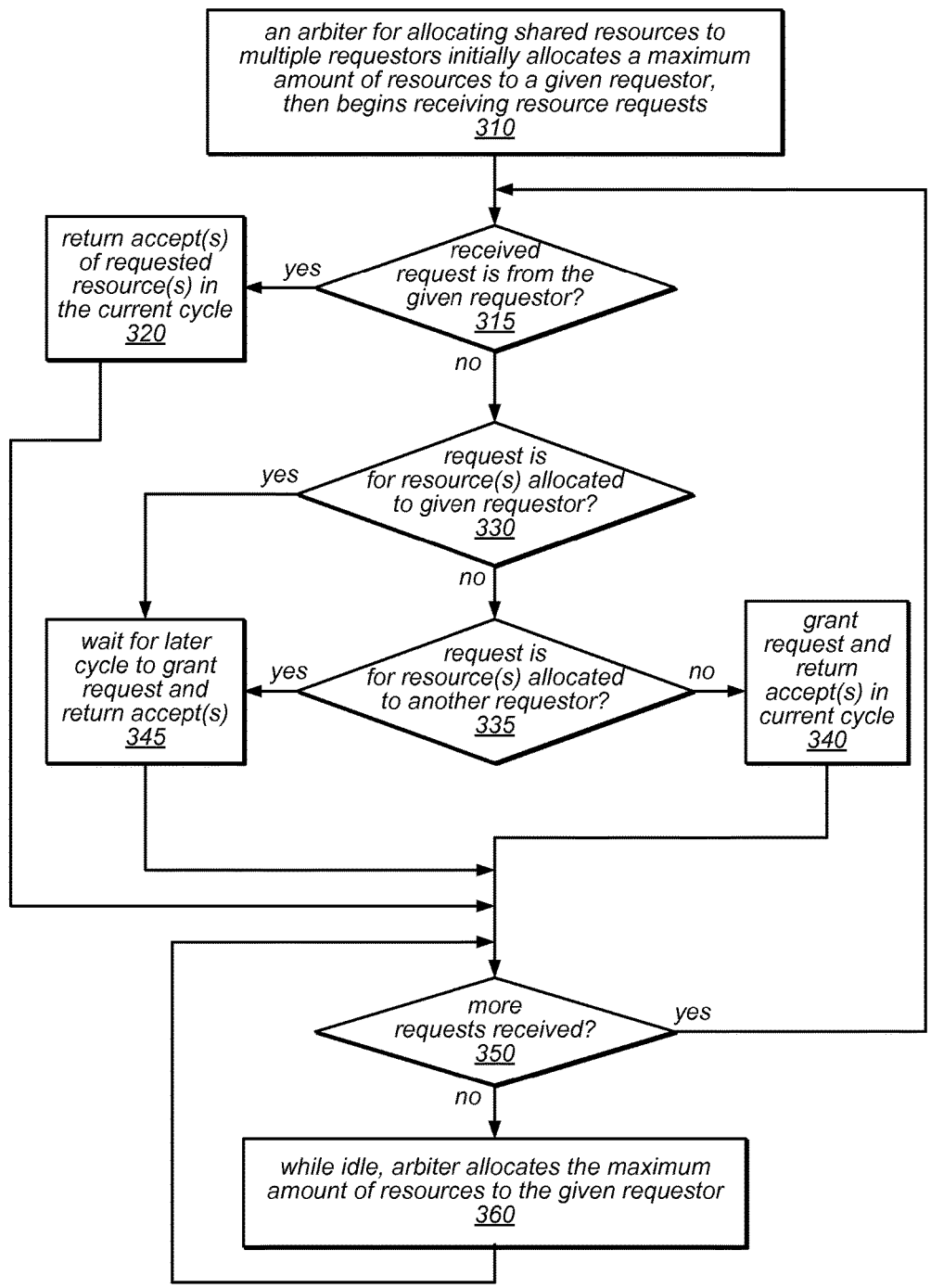
FIG. 3 is a flow diagram illustrating one embodiment of a method for managing resources in systems in which shared resources are initially allocated to a particular requestor.

One embodiment of a method for managing resources in a system in which shared resources are initially allocated to a particular requestor (e.g., a high priority requestor or one that has special status in the system) is illustrated by the flow diagram in FIG. 3. As illustrated at 310, in this example, the method may include an arbiter that is configured to allocate shared resources to multiple requestors initially allocating a maximum amount of resources to a given requestor, and then beginning to receive resource requests. For example, the arbiter may initially allocate the maximum amount of the shared resources to a requestor having a higher priority than the other requestors or one for which more resources must be available in order to grant requests for shared resources as early as possible. As illustrated in FIG. 3, if a received resource request originated from (or on behalf of) the given requestor (shown as the positive exit from 315), the method may include granting the request and returning the corresponding accept(s) for the requested resource(s) during the current clock cycle (e.g., during a first possible clock cycle), as in 320.

As illustrated in this example, if the received resource request is not received from the given requestor (shown as the negative exit from 315), the method may include determining whether the request is for one or more resources that are allocated to the given requestor (as in 330). If the request is for one or more resources that are allocated to the given requestor (shown as the positive exit from 330), or if the request is for one or more resources that are allocated to another requestor (shown as the positive exit from 335), the method may include waiting until a later cycle to grant the request and return the corresponding accept(s), as in 345. Otherwise, if the request is for resources that are not allocated to any other requestor (shown as the negative exit from 335), the method may include granting the request and returning the corresponding accept(s) during the now-current cycle (as in 340).

In this example, after the received resource request is granted (or denied, a case not shown in this example), the method may include repeating some or all of the operations illustrated in FIG. 3 for each additional resource request, as appropriate. For example, for each additional resource request that is received, the method may include determining whether the request was received from the given request (as in 315) and/or whether the request is for resources that are already allocated to the given requestor or to another requestor (as in 330 and/or 335) and either granting the request at the first available opportunity (as in 340) or waiting until a subsequent cycle to grant the request (as in 345). This is illustrated in FIG. 3 by the feedback from 340 and 345 to 350 and from the positive exit of 350 to 315. However, while the arbiter is idle (e.g., during periods in which no resource requests are received for some or all of the shared resources), the method may include the arbiter again allocating the maximum amount of resources to the given requestor. This is illustrated in FIG. 3 by the path from the negative exit of 350 to 360 and from 360 back to 350.

As previously noted, in some embodiments, the request signal may remain asserted until the request is granted (or denied). In different embodiments, the resource requirements for granting the request may or may not change between each subsequent pair of attempts (e.g., there may be more than two different possible sets of resource requirements for granting the request at different times). For example, the amount of resources required to grant the request on a third or fourth clock cycle may be less than are required to grant the request during the second clock cycle. In some embodiments, if the arbiter is still not able to grant the request after a pre-determined maximum number of clock cycles, the request may be denied and may need to be resubmitted. Note also that, while FIG. 3 illustrates an example embodiment in which other requestors are not prevented from gaining (being granted) access to resources that are not currently being requested by a high priority requestor (e.g., one with special status in terms of at least of the resource allocation/arbitration decisions), in other embodiments, they may be blocked from gaining access to a particular resource while the high priority requestor is parked on that resource.

Note that, while a system may include multiple components that can request the same shared resources, not all of the shared resources may be accessible to all of the requesting components. In other words, in some embodiments, different shared resources (or different subsets of a collection of shared resources) may have different potential requestors and/or different numbers of potential requestors. For example, some requestors may only be able to request access to a single shared resource (or a particular portion of a collection of shared resources), which may or may not have multiple potential requestors. Other requestors may be able to request access to two or more shared resources (or multiple portions of a collection of shared resources), each of which may or may not have multiple potential requestors.

Note also that, while many of the examples included herein describe the use of adaptive resource management techniques in systems that include a single requestor with special status (or a relatively higher priority compared to all other requestors), in other embodiments, multiple ones of the requestors may have a special status or high priority. In such embodiments, the arbiter may be configured to apply a more complex version of the parking mechanism (any of a variety of different parking algorithms) in an attempt to optimize allocation of the shared resources. Such a mechanism may be dependent on the code stream and/or on what each of the high priority requestors is doing (or is likely to be doing) when requests are being received from multiple high priority requestors. In one example, for a given shared resource, the arbiter may be configured to park the high priority requestor that most recently won the arbitration for that shared resource. In another example, the arbiter may be configured to park a different high priority requestor on a particular shared resource than the one that most recently won the arbitration for that shared resource (e.g., in a round robin fashion).

Figure 4:
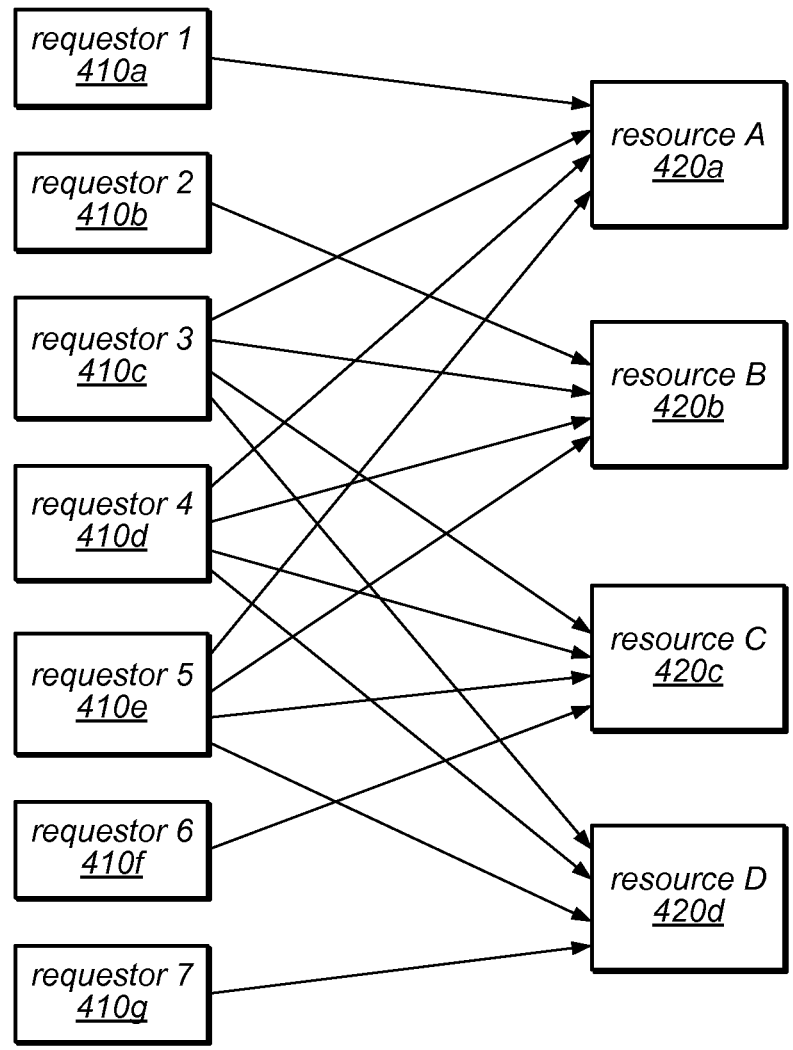
FIG. 4 is a block diagram illustrating the different combinations of shared resources and potential requestors that are possible in an example system.

FIG. 4 is a block diagram illustrating the different combinations of shared resources and potential requestors that are possible in an example system (e.g., a system in which a resource allocator/arbiter is configured to receive and respond to requests to access shared resources using some or all of the techniques described herein). In this example, there are four shared resources (resources 420a-420d) and seven potential requestors (requestors 410a-410g). However, not all of the requestors 410 can request all of the resources 420. Instead, some of the requestors 410 can request only a single one of the resources 420, while other requestors 410 can (potentially) request any of the four resources 420. Specifically, requestor 1 (410a) can only request resource A (420a), requestor 2 (410b) can only request resource B (420b), requestor 6 (410f) can only request resource C (420c), and requestor 7 (requestor 410g) can only request resource D (420d). However, requestor 3 (410c), requestor 4 (410d) and requestor 5 (410e) can each (potentially) request any one or more of shared resources A-D (420a-420d).

In the example illustrated in FIG. 4, each of the resources 420 has four potential requestors, but the set of potential requestors is different for each of the resources 420. For example, the potential requestors of resource A (420a) include requestor 1 (410a), requestor 3 (410c), requestor 4 (410d), and requestor 5 (410e). Similarly, the potential requestors of resource B (420b) include requestor 2 (410b), requestor 3 (410c), requestor 4 (410d), and requestor 5 (410e); the potential requestors of resource C (420c) include requestor 3 (410c), requestor 4 (410d), requestor 5 (410e), and requestor 6 (410f); and the potential requestors of resource D (420d) include requestor 3 (410c), requestor 4 (410d), requestor 5 (410e), and requestor 7 (410g). In other embodiments, different mappings and combinations of shared resources and potential requestors may be supported in the system, and the resource allocator/arbiter may be configured to handle requests to the shared resources using some or all of the adaptive resource management techniques described herein.

Figure 5C:
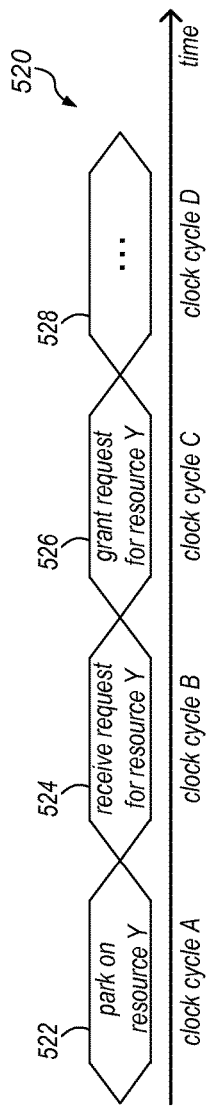

FIGS. 5A-5E illustrate portions of example timelines during which resource requests are received and granted in different systems, including some that implement the adaptive resource management techniques described herein. For example, FIG. 5A illustrates a portion of a timeline 500 that includes four clock cycles (clock cycles A-D, shown as 502, 504, 506, and 508). In this example, the system does not implement the adaptive resource management techniques described herein (techniques that include parking idle resources on a particular requestor, for example). In this example, during clock cycle A (shown as 502), an arbiter receives a request for a resource X. Here, resource X happens to be available to be allocated to the requestor right away, and the request for resource X is granted at the first available opportunity (e.g., during clock cycle B, shown as 504). In this example, other operations (e.g., operations unrelated to this request) may take place during clock cycles C and D (shown as 506 and 508).

FIG. 5B illustrates a portion of a timeline 510 that includes four clock cycles (clock cycles A-D, shown as 512, 514, 516, and 518). In this example, the system does not implement the adaptive resource management techniques described herein (techniques that include parking idle resources on a particular requestor, for example). In this example, during clock cycle A (shown as 512), an arbiter receives a request for a resource Y. Here, resource Y is not available to be allocated to the requestor right away (or it cannot be determined that resource Y is available in time to be able to grant the request during the first opportunity to do so). Therefore, the request for resource Y is not granted during clock cycle B (shown as 514). Instead, the request for resource Y cannot be granted until at least the next clock cycle (assuming it is available at that point). Here, the request for resource Y is granted to the requestor during clock cycle C (shown as 516). In this example, other operations (e.g., operations unrelated to this request) may take place during clock cycles B and D (shown as 514 and 518).

FIG. 5C illustrates a portion of a timeline 520 that includes four clock cycles (clock cycles A-D, shown as 522, 524, 526, and 528). In this example, the system implements at least some of the adaptive resource management techniques described herein (techniques that include parking idle resources on a particular requestor, for example). In this example, during clock cycle A (shown as 522), an arbiter parks a given requestor on idle resource Y. During clock cycle B (shown as 524), the arbiter receives a request for resource Y from the requestor parked on resource Y. Therefore, resource Y is available to be allocated to the requestor right away, and the request for resource Y is granted at the first available opportunity (e.g., during clock cycle C, shown as 526). In this example, other operations (e.g., operations unrelated to this request) may take place during clock cycle D (shown as 528).

Figure 5D:
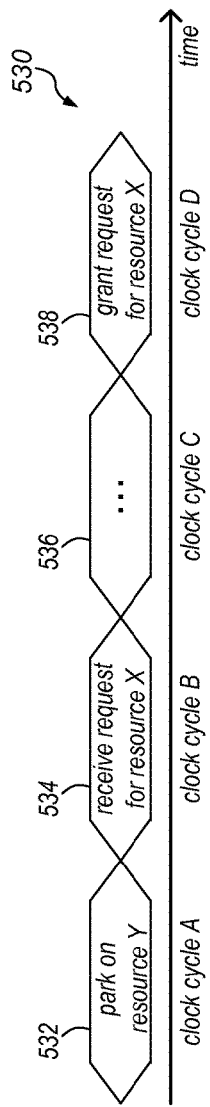

FIG. 5D illustrates a portion of a timeline 530 that includes four clock cycles (clock cycles A-D, shown as 532, 534, 536, and 538). In this example, the system implements at least some of the adaptive resource management techniques described herein (techniques that include parking idle resources on a particular requestor, for example). In this example, during clock cycle A (shown as 532), an arbiter parks a given requestor on idle resource Y. During clock cycle B (shown as 534), the arbiter receives a request for resource X from one of the requestors (e.g., the requestor parked on resource Y or another requestor). Here, resource X is not available to be allocated to the requestor right away (or it cannot be determined that resource X is available in time to be able to grant the request during the first opportunity to do so). Therefore, the request for resource X is not granted during clock cycle C (shown as 536). Instead, the request for resource X cannot be granted until at least the next clock cycle (assuming it is available at that point). Here, the request for resource X is granted to the requestor during clock cycle D (shown as 538). In this example, other operations (e.g., operations unrelated to this request) may take place during clock cycle C (shown as 536).

Figure 5E:
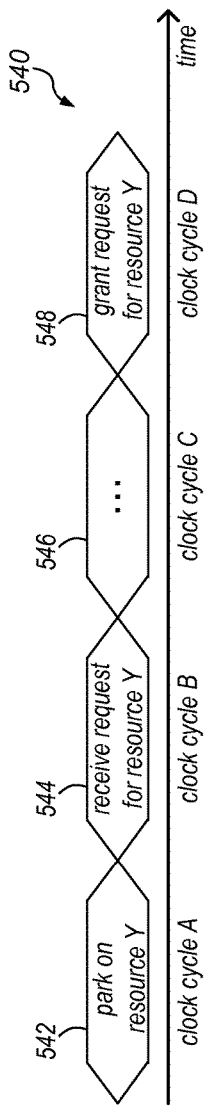

FIG. 5E illustrates a portion of a timeline 540 that includes four clock cycles (clock cycles A-D, shown as 542, 544, 546, and 548). In this example, the system implements at least some of the adaptive resource management techniques described herein (techniques that include parking idle resources on a particular requestor, for example). In this example, during clock cycle A (shown as 542), an arbiter parks a given requestor on idle resource Y. During clock cycle B (shown as 544), the arbiter receives a request for resource Y from a requestor other than the requestor parked on resource Y. Therefore, resource Y is not available to be allocated to the requestor right away, and the request for resource Y is not granted during clock cycle C (shown as 546). Instead, the request for resource Y cannot be granted until at least the next clock cycle (assuming it is available at that point). Here, the request for resource Y is granted to the requestor during clock cycle D (shown as 548). In this example, other operations (e.g., operations unrelated to this request) may take place during clock cycle C (shown as 546).

Note that while FIGS. 5A-5E illustrate timelines in which the first possible opportunity to grant a request for a shared resource may be during the clock cycle that immediately follows the clock cycle during which the request was received, in other embodiments, the sequential clock cycles A-D illustrated in these figures may not be immediately consecutive clock cycles. In other words, in some embodiments, there may be gaps (e.g., periods of timing lasting one or more clock cycles) between the receipt of a resource request and the first possible opportunity to grant the request and/or between any two such opportunities (including, for example, between the first such opportunity and the next such opportunity). In still other embodiments, the first possible opportunity to grant a request for a shared resource may be in the same clock cycle during which the request was submitted and/or received. In one such embodiment, when a requestor is parked on the maximum possible resources, the request and the granting of the request may occur during the same cycle (i.e., the first opportunity to grant a request may be during the clock cycle in which the request was received and the next opportunity to grant a request may be during the following clock cycle). For example, in some embodiments, a transaction may be granted (e.g., the requestor is granted access to the requested resource and may proceed to operate on it) only when its request is "valid" (e.g., asserted) and an accept signal generated by the arbiter is also asserted during the same clock cycle. In such an embodiment, in the example described above, both the request and grant illustrated in FIG. 5C may instead occur during the same cycle (e.g., cycle B). In addition, the request for resource X illustrated in FIG. 5D may instead be granted in clock cycle C; and the request for resource Y in cycle B (as illustrated in FIG. 5E) may instead be granted during clock cycle C.

In various embodiments, including those in which the timing between resource requests and grants for particular resources and/or for requests originating from (or on behalf of) particular requestors is especially tight, the arbiter may have enough information to determine the resources that are required in order to grant resource requests at various different times, even if the requestors themselves do not. Therefore, the requestors may not need to be concerned with the time-varying nature of this determination, but may instead request only the minimum amount of resources required to perform a given task and may rely on the arbiter to handle the determination.

The techniques for performing adaptive resource management, as described herein, may be further illustrated by way of an example system that includes a multiple banked memory. In various embodiments, such a system may include multiple requestors (e.g., a general-purpose processor core, a special-purpose processor core, a direct memory access (DMA) controller, a message-passing interface component, a network interface component, and/or a peripheral device), each of which may, from time to time, request access to one or more memory banks in order to perform a task. In various embodiments, the multiple banked memory may be configured as an interleaved memory or a non-interleaved memory, and a memory allocation component may be configured to arbitrate access to the various banks within the multiple banked memory, as described herein.

Figure 6:
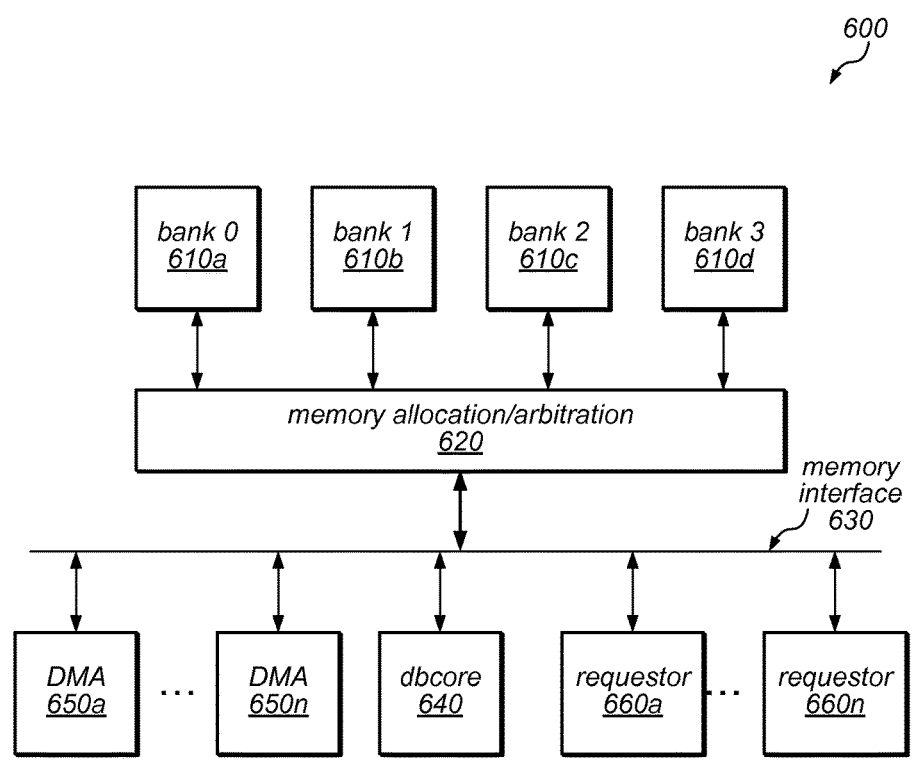
FIG. 6 is a block diagram illustrating one embodiment of a system that includes a multiple banked memory and in which adaptive resource management is performed by a memory allocation/arbitration component.

FIG. 6 is a block diagram illustrating one embodiment of such a system (e.g., a system that includes a multiple banked memory and in which adaptive resource management is performed by a memory allocation/arbitration component). In this example, system 600 includes, among other things, four memory banks (shown as memory banks 610a-610d) that are shared among multiple requestors and that may collectively be referred to as the DMEM, a memory allocation/arbitration component 620 (which may be a pipelined arbiter), and a memory interface 630 (which may include and/or perform the functions of a data bus, clock signals, word address selection, chip selection, row/column selection and/or bank selection, among other things). In this example, the potential requestors for the shared memory banks 610 include multiple DMA components/controllers (shown as 650a-650n), a special-purpose core (shown as dbcore 640), and multiple other requestors (shown as requestors 660a-660n), which may be of similar or different component types. In one embodiment, one or more of the other requestors 660a-660n may implement a message-passing interface (e.g., an interface through which messages may be passed between a CPU core and a corresponding direct-access memory or between two CPU cores). In another embodiment, one or more of the other requestors 660a-660n may be a general-purpose processor.

In this example, each of the DMA components/controllers 650a-650n may be a DMA engine that is configured to pre-load a particular one of memory banks 610a-610d with data on which a processor core (e.g., dbcore 640 or a general-purpose core) wants to operate. Once the data has been pre-loaded, the DMA engine may tell the processor core that it can proceed to operate on that data. When the processor core is finished operating on the data, it may tell the DMA engine, after which the DMA engine may be configured to unload the result(s) from the DMEM. In this example, the dbcore 640 may be a special-purpose core (e.g., a database processor) that has special status within the system and/or a higher priority with respect to requests for DMEM resources than one or more of the other requestors (e.g., the DMA components/controllers 650a-650n and the other requestors 660a-660n). Note that, in some embodiments, memory interface 630 and/or memory allocation/arbitration component 620 may include one or more request buffers, which may be configured to hold requests for DMEM resources until they have been processed and/or acted upon by memory allocation/arbitration component 620 (e.g., by granting or denying the requests).

In this example, as in the example illustrated in FIG. 4, not all of the requestors may be able to direct requests to all of the memory banks 610. For example, each of the DMA components/controllers 650a-650n may be associated with a respective one of the memory banks 610a-610d, and may not be a potential requestor for any other ones of the memory banks 610a-610d. However, memory allocation/arbitration component 620 may be configured to direct resource requests received from (or on behalf of) dbcore 640 and some or all of the other requestors 660a-660n to any given bank, based on the addresses specified in the requests. Therefore, for each of the memory banks 610a-610d, there may be multiple requestors, including dbcore 640, one or more of DMA components/controllers 650a-650n (each of which is a requestor for only a single one of the memory banks 610a-610d), and one or more of the other requestors 660a-660n. Note that, in some embodiments, the dbcore may be able to submit 32-bit requests, which require access to only one of the memory banks 610a-610d, or 64-bit requests, which require access to two of the memory banks 610a-610d.

In this example, from a logic standpoint, each memory bank may be treated independently by the memory allocation/arbitration component 620, and each bank may not know about the other banks. Here, for the requestors that can request multiple banks, the memory allocation/arbitration component may use the address specified in each request to direct it to the appropriate memory bank. In this example, however, one requestor (dbcore 640) may deliver its address very late in the request cycle. While the address may be delivered in time for the memory allocation/arbitration component to determine the memory bank to which each received request should be delivered, it may not be delivered in time to generate and send an accept (an accept that is qualified using that address) back to the requestor during that cycle such that the requestor can synchronize with the accept. In other words, the timing of the receipt of the address associated with the request may be sufficient to allow the activation of the appropriate portion of the DMEM by a memory allocation/arbitration component that observes the address, but may not be sufficient to be able to put that address into the cone of logic that generates the accept to be returned to the requestor during the first available clock cycle.

In a previous system exhibiting this timing issue, each time the dbcore needed to access to any of the memory banks, it was required to request access to all of the memory banks, regardless of the target address specified in the request. Under this prior solution to this timing issue, any request that originated from (or on behalf of) the dbcore was granted only when all of the memory banks were available, even if the dbcore only needed to access one of them or, perhaps (e.g., in the case of a 64-bit access) two of them. Since the dbcore was the highest priority requestor in the system, this earlier solution resulted in the dbcore being granted access to all of the memory banks in response to each of its requests, thus blocking any other requestors (e.g., any of the multiple DMA components/controllers 650a-650n and/or other requestors 660a-660n) from winning arbitration for those memory banks, even though the dbcore did not actually need to access all of the memory banks in order to perform its task. Although the address specified in the request was used locally (e.g., in the DMEM) to suppress writes to the unused memory banks, this previous approach resulted in memory banks that were not actually needed by the dbcore being unavailable to any other requestors in the cycle during which the requestor was granted access to all of the memory banks, and at least some of these memory banks being unavailable during the time between the receipt of the request and the clock cycle during which the request was eventually granted. This blocking of other requestors had the effect of reducing the throughput of the DMEM by 75% when the dbcore was requesting access to one of the memory banks. In at least some embodiments of the systems described herein (those that implement some or all of the adaptive resource management techniques described above), the amount of bandwidth given up in order to accommodate timing issues of one of the requesting components (such as the dbcore component in the example presented above) may be significantly reduced when compared to this previous resource management approach.

In the example system illustrated in FIG. 6, due to the protocol that was created for the request ports into the DMEM, and in order to meet the timing constraints of the protocol, the memory allocation/arbitration component was implemented using a pipelined arbiter. In the protocol created for this example system, a request port could receive an accept from the arbiter even if it was not making a request. In this example, because the arbitration was pipelined, in response to various requestors submitting requests for access to different ones of the memory banks, the arbiter would make the decision about which requestor would be granted each of the memory banks during the next clock cycle. For example, if multiple requestors submitted requests that were directed to the same memory bank during one particular clock cycle, the arbiter would determine which of the requestors was to be granted access to that memory bank during the clock cycle immediately following that clock cycle (the clock cycle during which the requests were made).

Note that, in various embodiments, pipelining a resource arbiter may cause a reduction in overall throughput for a collection of shared resources (such as the DMEM described above) because acceptance of a request during one clock cycle may be dependent on what was requested during the previous cycle. For example, in a system that implements a pipelined arbiter, it may take at least one cycle for a request to be granted. In addition, when the request is removed, a requestor (e.g., the highest priority requestor) may still win the arbitration for the requested resource based on a request it made during a previous clock cycle. This may result in the requested resource (e.g., one of the memory banks of the DMEM, in the example described above) not being used by a requestor (e.g., a requestor other than the highest priority requestor) during a cycle in which it could have been by that other requestor.

In some embodiments, the example system illustrated in FIG. 6 may implement some or all of the adaptive resource management techniques described herein. For example, in one such embodiment, the dbcore may only need to request one memory bank, rather than requesting access for all of the memory banks (as was required in the previous solution described above). However, because of the timing issue described above, the arbiter may be configured to issue the accept (e.g., for the requested memory bank only or for all of the memory banks, in different embodiments) during the first available clock cycle only if all of the memory banks are available during the first clock cycle (e.g., only if there are not any other requestors for any of the memory banks). In this example, during subsequent cycles, a pipelined version of the requested address may be used to determine the memory bank to which each additional request is directed, and only the memory bank that was requested needs to be available in order to grant the request. In some embodiments, this approach may allow the memory banks that were previously being blocked to be used by other requestors, which may significantly improve the overall performance of the banked memory.

In some embodiments, the arbitration performed on a per bank basis in the pipelined arbiter may differ from that performed in previous embodiments of the system illustrated in FIG. 6 in at least the fact that it implements a "parking" mechanism, such as that described above. More specifically, because the dbcore has a special status in the system, when no one is requesting a particular one of the memory banks, the arbiter may be configured to award that memory bank to the dbcore. In some embodiments, this may be true for all of the memory banks, which (internally) may have similar structures/features and which may employ similar protocols with respect to resource arbitration. As noted above, the effect of this parking technique may be to remove the pipeline penalty in an idle system when the dbcore makes a request. For example, in an idle system (one in which no other requests are being made), all of the memory banks may be accepting dbcore requests, and the dbcore may be able to win the arbitration on the first clock cycle (if no other ports are requesting any of the memory banks). In other words, because the dbcore is parked on any and all of the memory banks that are not currently being requested by other requestors, when a request from the dbcore is received, it may not need to wait for a subsequent cycle to receive its accept. In some embodiments, this parking technique may also allow the dbcore to stream data when no other request ports are requesting access to the memory banks that are (at least potentially) being used by the dbcore. In this example, if another requestor submits a request that targets one of the memory banks (e.g., a request that only needs to specify the particular memory bank that is required to perform a task) while the dbcore is parked on all of the memory banks, the other requestor may have to wait until at least the next clock cycle to be granted the memory bank receive its accept.

As described above, in some embodiments of the system illustrated in FIG. 6, the pipelined nature of the arbiter may not prevent the dbcore from winning an allocation/arbitration decision on the first clock cycle if the arbiter implements the parking mechanism described above. In such embodiments, although the timing of the request may not make it possible for the arbiter to use the specific address that was included in the request in the accept, the arbiter may still be able to grant the accept if the dbcore was parked on all of the memory banks. If one or more additional requests are received from the dbcore (e.g., immediately after the first such request), since the arbiter is pipelined, it may have the information it needs in time to include that information in the accepts for those additional requests. For example, if, on the first clock cycle of a request (e.g., in an empty machine in which no other requestors are currently requesting access to the memory banks), the dbcore makes a request, and has been parked on all four memory banks, the dbcore will win the allocation/arbitration decision. On the other hand, if the dbcore does not win the allocation/arbitration decision (e.g., because another requestor has requested one of the banks), the arbiter may, on the second clock cycle of the request, use the address that was included in the request and that has been pipelined in, and may send an accept to the dbcore based on that pipelined version of the address. In that case, only the memory bank to which the request is actually directed needs to be available in order to grant the request.

In at least some embodiments of the system illustrated in FIG. 6, the timing constraints associated with the use of the address included in a request may affect the timing for the accepts that are sent back to the dbcore. In some such embodiments, the DMEM may, on at least the first clock cycle of a request, be configured to send all four accepts from the four memory banks to the dbcore (assuming the dbcore has been parked on all four memory banks, as described above). In this example, the dbcore may, in response to receiving the four accepts, be able to determine that it will be granted the resources it needs, and may be able to use the address locally to generate the corresponding accept. In other words, the rules for generating the accept may be implemented locally by the dbcore (and the timing may be sufficient to do that). However, in at least some embodiments of the system illustrated in FIG. 6, there may be a respective protocol monitor on each requestor port that monitors the protocol (e.g., either during verification of the system or as an ongoing process when the system is in use). In such embodiments, all of the ports may adhere to the same protocol and be subject to the same protocol monitoring. In some embodiments, configuring the DMEM to send accepts from all four of the memory banks to the dbcore, and relying on the dbcore to use the address locally to generate the accept, may be inconsistent with the protocol monitors and/or may not allow the applicable timing constraints to be met.

As noted above, in some embodiments of the system illustrated in FIG. 6, the dbcore may not be required to request all four memory banks at once (e.g., it may only need to request the memory bank it needs). The arbiter (being a pipelined arbiter) may know, during the first clock cycle of a request, whether all four memory banks are available. If so, the arbiter may be configured to filter the accepts back to the dbcore in a manner that does not rely on the use of the address that was received directly from the dbcore as part of the request. For example, in one embodiment, the two bits of the address that are needed to decode which of the memory banks is needed may be registered locally (e.g., by the arbiter) and the requirements of what is needed to send the accept back to the dbcore may change on a per cycle basis. In this example, during the first clock cycle of a request, even though the dbcore requests only the memory bank it needs, the dbcore may need to win the arbitration for all four memory banks in order for the accept to be sent. However, from the second clock cycle on, the dbcore may only be required to win the arbitration for the one bank it needs, and the arbiter may be configured to use the registered version of the relevant address bits (e.g., a pipelined version of the address in the request) to qualify the accept that is sent back to the dbcore.

As previously noted, in some embodiments of the system illustrated in FIG. 6, the dbcore may submit a 64-bit request, which would access two of the memory banks (whereas a 32-bit request would access only one memory bank). In such embodiments, if a 64-bit request is received during a first clock cycle, and if all four memory banks are available (e.g., if the dbcore is parked on all four banks), the arbiter may be configured to grant the request, giving the dbcore access to the two memory banks it needs. However, if all four memory banks are not available, the arbiter may not be able to grant the request during the first clock cycle. Instead, the arbiter may be configured to determine, during a second clock cycle, whether both memory banks needed by the dbcore are available. If so, the arbiter may grant the request during the second clock cycle. Note, however, that in other embodiments, a 64-bit request made by the dbcore may be treated as two separate requests, each of which targets one of the two memory required memory banks to obtain the high and low 32-bit portions of the target data, respectively.

In one specific embodiment of the system illustrated in FIG. 6, the logic for implementing the techniques described herein for managing time-varying resource requirements may be thought of as residing between dbcore 640 and the DMEM (the collection of memory banks 610a-610d) and, more specifically, in the path between between memory allocation/arbitration component 620 and the "enable" inputs on the SRAM devices that make up the DMEM. In this embodiment, the logic for implementing a dbcore grant (e.g., for granting a request made by the dbcore for a given memory bank) may be illustrated by the following example pseudo-code:

```
If (this is the first clock cycle of a request) &&
    (all banks are granting access to the dbcore, e.g., via parking)
    {
        grant dbcore
    }
    else
    {
        if (this is the second clock cycle of the request or later) &&
            (the bank requested is granting dbcore (based on pipelined
            address))
            {
                grant dbcore
            }
        else
            {
                don't grant dbcore
            }
    }
```

Note that, at least during the first clock cycle, the logic represented by the pseudo-code shown above may not include a determination of whether or not the dbcore is actually requesting access to this particular memory bank. Instead, the dbcore may granted access to the memory bank regardless of whether or not it was requested, as long as the dbcore is parked on all memory banks when a request for access to any DMEM resources is received. Note also that, in some cases, three of the four memory banks may have been granted to the dbcore due to the dbcore being parked on them when no request (by the dbcore or any other requestor) was being made. However, one of the memory banks may have been granted to the dbcore as a result of a prior dbcore request that was accepted on the previous cycle (e.g., the pipelined arbiter may cause the parking of a memory bank to a previously granted requestor on the cycle following the grant).

In this example embodiment, the logic for implementing the dbcore component corresponding to a given SRAM enable pin may be illustrated by the following example pseudo-code:

```
If (this is the first clock cycle of a request) &&
    (the dbcore is making a request for DMEM resources) &&
    (all banks are granting access to the dbcore, e.g., via parking) &&
    (this SRAM device is in the desired bank (based on the request
    address))
    {
        enable SRAM
    }
else
    {
        if (this is the second clock cycle of the request or later) &&
            (the dbcore is making a request for DMEM resources) &&
            (arbiter is granting access to the dbcore (based on the request
            address))
            {
                enable SRAM
            }
        else
            {
                don't enable SRAM
            }
    }
```

As in the previous example, in some cases, three of the four memory banks may be granted to the dbcore due to the dbcore being parked on them when no request (by the dbcore or any other requestor) was being made. However, one of the memory banks may be granted to the dbcore as a result of a prior dbcore request that was accepted on the previous cycle (e.g., the pipelined arbiter may cause the parking of a memory bank to a previously granted requestor on the cycle following the grant). Note that, in this example, the output of the logic represented by the pseudo-code shown above may be combined (e.g., ORed) with the outputs of all of the other request port components that implement similar logic, each of which represents the AND of a request signal and a grant signal from that particular request port for the given SRAM.

Figure 7:
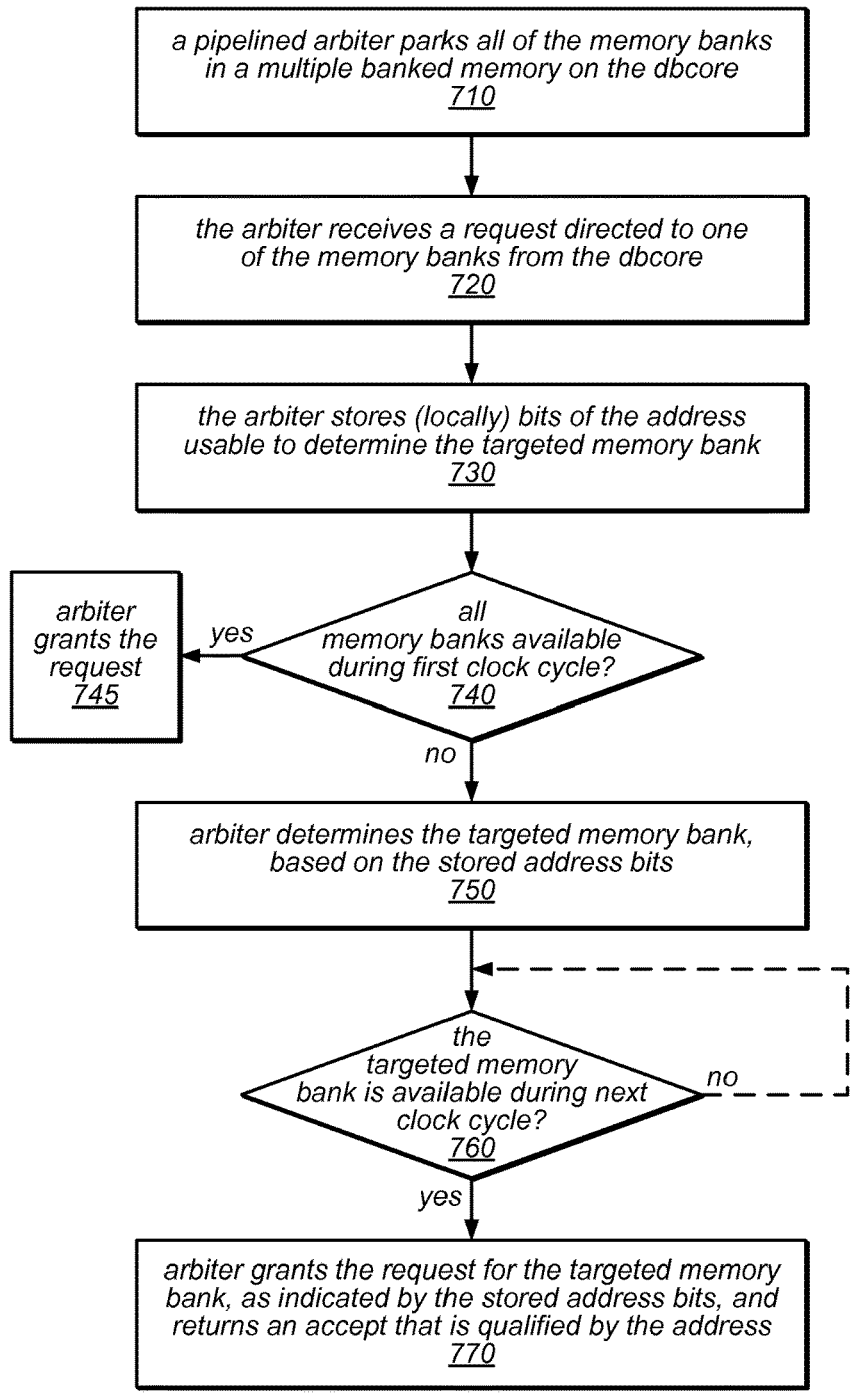
FIG. 7 is a flow diagram illustrating one embodiment of a method for performing adaptive resource management in a system that includes a multiple banked memory.

One embodiment of a method for performing adaptive resource management in a system that includes a multiple banked memory (such as that illustrated in FIG. 6) is illustrated by the flow diagram in FIG. 7. As illustrated at 710, in this example, the method may include a pipelined arbiter parking all of the memory banks in a multiple banked memory on the dbcore. For example, while no requests are being received and/or acted upon for the individual memory banks, the arbiter may be configured to pre-emptively allocate those memory banks to the dbcore. The method may, at some point in the future, include the arbiter receiving, from the dbcore, a request directed to one of the memory banks (as in 720), and the arbiter storing (locally) one or more bits of the address that are included in the request and that are usable to determine the targeted memory bank (as in 730). If all of the memory banks are available for allocation to the dbcore during the first clock cycle (shown as the positive exit from 740), the method may include the arbiter granting the request, as in 745. For example, if no other requestors have submitted requests for any of the memory banks since they were pre-emptively allocated to the dbcore, they may all be available for the use of the dbcore during the first clock cycle of the request, and the arbiter may grant the request.

As illustrated in this example, if not all of the memory banks are available for allocation to the dbcore during first clock cycle (shown as the negative exit from 740), the method may include the arbiter determining which of the memory banks is the targeted memory bank, based on the stored address bits (as in 750). For example, in some cases, one or more other requestors may have submitted requests for some or all of the memory banks since they were pre-emptively allocated to the dbcore, and they may not be available for allocation to the dbcore during the first clock cycle of the request. Therefore, the arbiter may be unable to grant the request. As illustrated in FIG. 7, if the targeted memory bank is available during next clock cycle (shown as the positive exit from 760), the method may include the arbiter granting the request for the targeted memory bank, as indicated by the stored address bits, and returning an accept that is qualified by the address (as in 770). If the targeted memory bank is not available during next clock cycle (shown as the negative exit from 760), the method may, in some embodiments, include repeating the operations shown in element 760 one or more times until the request can be granted or until the request is denied (e.g., after failing to satisfy the request before a pre-determined maximum number of clock cycles have gone by). This is illustrated in FIG. 7 by the dashed line from the negative exit of 760 to its input. As previously noted, in some embodiments, the request signal may remain asserted until the request is granted (or denied). In different embodiments, the resource requirements for granting the request may or may not change between each subsequent pair of attempts (e.g., there may be more than two different possible sets of resource requirements for granting the request at different times).

In various embodiments of systems that employ the adaptive resource management techniques described herein (e.g., those in which an arbiter, rather than the individual requestors, is configured to take time-varying resource requirements into account when handling resource requests), different tradeoffs may be made regarding which, if any, requestors are parked on particular resources and/or which, if any, requestors have a higher priority than others in allocation/arbitration decisions. For example, in some embodiments of the system illustrated in FIG. 6, a trade-off may be made involving the relative priority (and/or status) of the DMA components and the dbcore. In some embodiments, one of the functions of the DMA components may be to pre-load a section of the DMEM while the dbcore is operating on a different section of the DMEM (e.g., one that was pre-loaded by one of the DMA components earlier). For example, the dbcore may direct read and/or write operations to locations within a previously pre-loaded memory bank. In some embodiments, while the dbcore is operating on the target memory bank, one of the DMA components may be unloading the results of the operations performed by the dbcore.

In the example system illustrated in FIG. 6, this trade-off may be dependent on the expected code stream. For example, in some embodiments in which both the dbcore and one or more DMA components can request access to the same memory banks of the DMEM, 100% of the bandwidth of the DMEM may be dedicated to the dbcore whenever it is making a request (thus blocking out the DMA component while the dbcore is making a request). Note that, in some embodiments, when the dbcore is accessing sequentially increasing addresses (which may be a common pattern for the dbcore), the best that the dbcore can do may be to win the arbitration for the DMEM (or a particular memory bank thereof) during every other clock cycle, which may free up 75% of the bandwidth to be performing tasks on behalf of one of the DMA components. More specifically, when the dbcore accesses sequentially increasing addresses in a situation in which other ports are also making requests, the throughput of the dbcore may be reduced by 50% over the prior solution (e.g., a multiple memory banked system in which the dbcore had to request all four memory banks each time and no parking mechanism was employed). This is because when other ports are requesting, the dbcore may never be able to receive an accept in the first clock cycle. At best, if it is constantly changing the memory bank that it is requesting, its requests may be accepted on every other cycle. However, as discussed below, this trade-off may be acceptable for certain use models.

In some embodiments, the other request ports (those other than the port used by the dbcore) may be used to move data into the DMEM for the use of the dbcore or to move dbcore results out of the DMEM (e.g., to another on-chip memory component or for storage off-chip). In embodiments in which it is the job of the DMA to move data (e.g., more data than is moved by the dbcore), not all of which is necessarily going to be used, it may be better for the overall performance of the system to maximum bandwidth as described above, even at the expense of throughput for one of the requestors (the dbcore). More specifically, in an embodiment in which the dbcore was parked on all of the memory banks when no requestors were requesting access to the DMEM, a 300% improvement in DMEM bandwidth was realized when every bank was being requested while the dbcore was requesting (when compared to previous approaches). For example, in many cases, the dbcore may be performing one task while one or more other request ports (e.g., one or more of the DMA ports) are setting up the data needed for the next dbcore operation or are unloading the results of the prior dbcore operation. Since a likely scenario may be that the DMA components require more bandwidth per task than the dbcore, reducing the bandwidth of the dbcore while they are both operating may often be the most efficient approach.

Note that if, in the system described above or in a similar system, it is discovered that this trade-off (or a similar trade-off) is not valid, additional mechanisms may be applied. For example, if the most common next address is a serially increasing address, the dbcore may be configured request two banks at a time instead of one (e.g., one containing a first target address and one containing the next sequential address). This may allow 100% throughput to be dedicated to the dbcore in the streaming case, with a 25% decrease in overall bandwidth. In some embodiments, this mechanism may be employed in conjunction with (rather than instead of) the adaptive resource management techniques described herein (e.g., in a system in which the arbiter handles the fact that the requirements necessary for an accept to be sent can change on a per cycle basis). This mechanism may also be applied in systems that employ the previous solution (e.g., one in which the dbcore must request all of the memory banks and in which all of the accepts are sent to the dbcore), which may suffer from the same throughput issue that is experienced in a pipelined arbiter.

As previously noted, the adaptive resource management techniques described herein may be implemented in a non-pipelined arbiter as well as in a pipelined arbiter, in different embodiments. In either case, the arbiter (rather than the requestors themselves) may be configured to handle differences in the requirements for granting requests for shared resources at different times and/or may implement a parking mechanism in order to improve overall performance (e.g., bandwidth and/or throughput). For example, if the arbiter shown in the example system illustrated in FIG. 6 were a non-pipelined arbiter, it may still be configured to park the dbcore on any of the memory banks that are not being requested by other requestors and may not require the dbcore to request all of the memory banks when it only needs one of them. In this example, the arbiter may be configured to accept requests from the dbcore for memory banks that were not being requested by any other request port at the first possible opportunity to do so (e.g., during the first clock cycle of the request). Otherwise, the arbiter may be configured to wait until the next clock cycle to grant the request. In this example, the gains in overall throughput for the DMEM, and the decrease in dbcore throughput in busy situations, may be roughly the same for a pipelined version of the arbiter and a non-pipelined version of the arbiter.

While various techniques for implementing adaptive resource management are described in terms of specific systems having particular mixes of shared resources and requestors (such as the system illustrated in FIG. 6), these techniques may be employed in (and may improve the overall performance of) other systems that include shared resources, multiple requestors for those resources, and time-varying requirements for granting requests for those shared resources. For example, an implementation such as that described in reference to the system illustrated in FIG. 6, may be employed in any of a variety of integrated circuit devices that include multiple banked memories. In addition, similar mechanisms and concepts may be implemented in systems that have other types of shared resources and requestors, e.g., in any of a wide variety of situations in which the resources needed to perform a task vary with time and in which a resource allocator has access to information that at least some of the requestors do not have.

Example System

Figure 8:
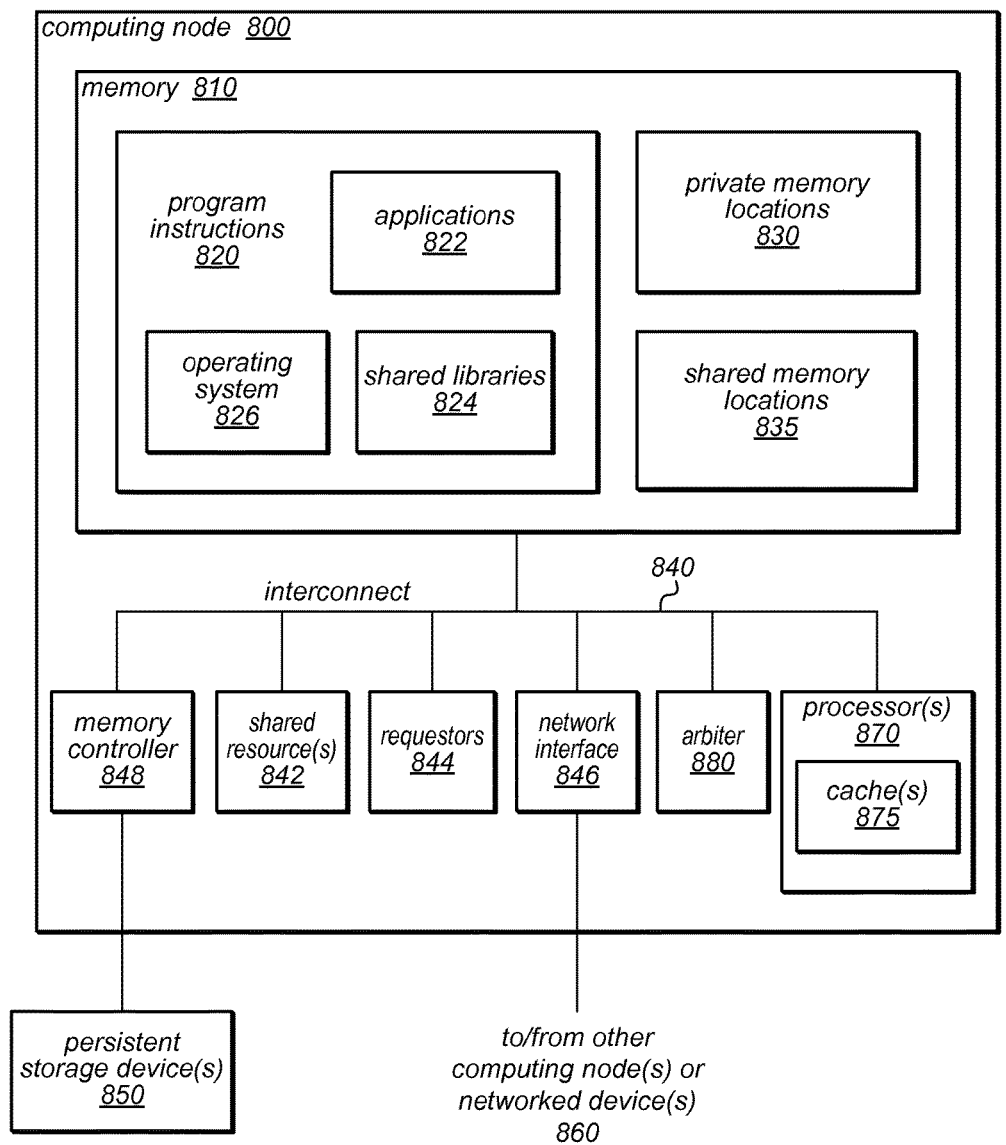
FIG. 8 illustrates a computing node that is configured to implement at least some of the methods described herein, according to various embodiments.

FIG. 8 illustrates a computing node that is configured to implement some or all of the methods described herein, according to various embodiments. The computing node 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the functionality of the mechanisms for performing adaptive resource management, as described herein, may be provided as (or invoked by) a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computing node 800 may include one or more processors 870; each may include multiple cores, any of which may be single or multi-threaded. For example, multiple processor cores may be included in a single processor chip (e.g., a single processor 870), and multiple processor chips may be included on a CPU board, two or more of which may be included in computing node 800. In various embodiments, one or more of the processors 870 may be (or include) a special-purpose processor core such as the database core (dbcore) described herein, and any or all of the processors 870 may be requestors for various ones of the shared resources 842 of computing node 800. Each of the processors 870 may include a hierarchy of caches 875, in various embodiments. For example, each processor 870 (or processor chip) may include one or more local caches (e.g., one L1 cache per processor core and/or one or more caches that are shared by multiple processor cores on a single processor chip, such as an L2 cache and/or a last level cache). As illustrated in this example, computing node 800 may include a memory controller 848 and/or a network interface 846. Computing node 800 may also include one or more shared resources 842, multiple requestors 844, and a shared resource arbiter 880 (which may be a pipelined arbiter or a non-pipelined arbiter, in different embodiments). The arbiter 880 may be configured to implement some or all of the adaptive resource management techniques described herein for making allocation/arbitration decisions when requests to access to shared memory locations 835 and/or other shared resources 842 are received from multiple ones of the requestors 844 and/or processors 870, including when requirements for granting those requests may vary depending on the clock cycle during which information that informs those decisions is available and/or depending on the clock cycle during which those decisions are made. In some embodiments, shared memory locations 835 may include a multiple banked memory, such as the DMEM described above, access to which may be requested by any one or more of the processors 870 and/or other requestors 844.

As illustrated in FIG. 8, computing node 800 may also include or have access to one or more persistent storage devices 850 (e.g. optical storage, magnetic storage, hard drive, tape drive, solid state memory, etc., that is external to, but accessible by, computing node 800), and one or more system memories 810 (e.g., one or more of cache, SRAM, DRAM, RDRAM, EDO RAM, DDR 10 RAM, SDRAM, Rambus RAM, EEPROM, etc.). In some embodiments, system memory 810 may store a portion of a data set for an application on which processor(s) 870 may operate locally. For example, memory 810 on computing node 800 may include local storage (e.g., within private memory locations 830 or shared memory locations 835) for data structures, elements of which may be the targets of various functions of an application, and requests for which by different requestors may be arbitrated by arbiter 880. In some embodiments, memory 810 may include persistent storage (e.g., for storing firmware or configuration parameter values that are fixed for a given computing node or a given set of configuration registers). In other embodiments, configuration registers or configuration parameters stored in system memory 800 may be programmable (e.g., at runtime). Various embodiments of computing node 800 may include fewer or additional components not illustrated in FIG. 8 (e.g., video cards, audio cards, additional network interfaces, peripheral devices, a network interface such as an ATM interface, an Ethernet interface, a Frame Relay interface, etc.)

In this example, the one or more processors 870, the memory controller 848 (which may provide access to storage devices 850), the shared resources 842, the requestors 844, the arbiter 880, the network interface 846, and the system memory 810 may be coupled to the system interconnect 840. One or more of the system memories 810 may contain program instructions 820. Program instructions 820 may be executable to implement one or more applications 822 (which may include all or a portion of an application that employs various requestors to access shared resources in order to perform functions thereof), shared libraries 824, or operating systems 826. Program instructions 820 may be encoded in platform native binary, any interpreted language such as Java™ byte-code, or in any other language such as C/C++, Java™, etc. or in any combination thereof. The program instructions 820 may include functions, operations and/or other processes for performing or initiating the performance of adaptive resource management, as described herein. Such support and functions may exist in one or more of the shared libraries 824, operating systems 826, or applications 822, in various embodiments. The system memory 810 may further comprise private memory locations 830 and/or shared memory locations 835 where data (including portions of a data set for an application 822 and/or various configuration parameter values) may be stored. For example, private memory locations 830 and/or shared memory locations 835 may store data accessible to concurrently executing threads, processes, or transactions, in various embodiments. In addition, the system memory 810 and/or any of the caches of processor(s) 870 may, at various times, store data that has been fetched (or prefetched) from one of system memories 810 and/or from storage devices

850 by (or on behalf of) an application executing on computing node 800. Note that the system memory 810 and/or any of the caches of processor(s) 870 may, at various times, store any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of arbiters, shared resources and/or requestors, it should be noted that the techniques and mechanisms disclosed herein for performing adaptive resource management may be applicable in other contexts in which there are multiple shared resources, multiple requestors for those shared resources, and time-varying requirements for granting requests for those shared resources. It is intended that the following claims be interpreted to embrace all such variations and modifications.

What is claimed:
1. A system, comprising:
one or more shared resources; and
a resource arbiter;
wherein the resource arbiter is configured to:
 receive a request from one of a plurality of requestors for a given portion of the one or more shared resources;
 determine availability of a given amount of the one or more shared resources, wherein the given amount is required to be available during a given one of multiple clock cycles in order to grant the request during the given one of multiple clock cycles, wherein the given amount required to be available in order to grant the request during the given one of the multiple clock cycles is different than another amount of the one or more shared resources, wherein the other amount is required to be available in order to grant the request during the other one of the multiple clock cycles; and
 grant the request during the given clock cycle in response to determining that the given amount required to be available in order to grant the request during the given one of the multiple clock cycles is available during the given clock cycle.

2. The system of claim 1, wherein the resource arbiter is further configured to:
determine, in response to the given amount required to be available in order to grant the request during the given one of the multiple clock cycles not being available, whether or not the different amount required to be available in order to grant the request during the other one of the multiple clock cycles is available during the other clock cycle.

3. The system of claim 2, wherein the resource arbiter is further configured to:
grant the request during the other clock cycle in response to determining that the other amount required to be available in order to grant the request during the other one of the multiple clock cycles is available during the other clock cycle.

4. The system of claim 1, wherein the given amount required to be available in order to grant the request during the given one of the multiple clock cycles is greater than the other amount required to be available in order to grant the request during the other one of the multiple clock cycles.

5. The system of claim 4, wherein the given clock cycle precedes the other clock cycle.

6. The system of claim 1, wherein the given amount required to be available in order to grant the request during the given one of the multiple clock cycles is dependent on which of the plurality of requestors the request was received from.

7. The system of claim 1,
wherein a given one of the plurality of requestors has a special status among the plurality of requestors; and
wherein the resource arbiter is further configured to allocate to the given one of the plurality of requestors, prior to receiving the request and dependent on the special status, a maximum amount of the one or more shared resources that are available, wherein the maximum amount comprises at least the given amount required to be available in order to grant the request during the given one of the multiple clock cycles.

8. The system of claim 7,
wherein the one of the plurality of requestors from which the request was received lacks the special status among the plurality of requestors; and
wherein the resource arbiter is configured to refrain from granting the request during the given clock cycle, dependent on the lack of special status.

9. The system of claim 1,
wherein the one or more shared resources comprise a plurality of shared resources; and
wherein, for at least one of the plurality of shared resources, all of the plurality of requestors are potential requestors for the at least one shared resource.

10. The system of claim 1,
wherein the one or more shared resources comprise a plurality of shared resources; and
wherein, for at least one of the plurality of shared resources, fewer than all of the plurality of requestors are potential requestors for the at least one shared resource.

11. The system of claim 1,
wherein the one or more shared resources comprise a plurality of shared resources; and
wherein at least one of the plurality of requestors is a potential requestor for only a single respective one of the one or more shared resources.

12. The system of claim 1, wherein the given amount required to be available in order to grant the request during the given one of the multiple clock cycles is dependent on the one of the plurality of requestors to which the given portion of the one or more shared resources was most recently granted prior to the given one of the multiple clock cycles.

13. The system of claim 1,
wherein the one or more shared resources comprise one or more memory banks; and
wherein the plurality of requestors comprises two or more of: a general-purpose processor core, a special-purpose processor core, a direct memory access (DMA) controller, a message-passing interface component, a network interface component, or a peripheral device.

14. A method, comprising:
performing by a computer:
 receiving a request from one of a plurality of potential requestors for a given portion of one or more shared resources;
 determining availability, during a given one of multiple clock cycles, of a required amount of the one or more shared resources, wherein the required amount is required to be available during the given one of multiple clock cycles in order to grant the request during the given one of multiple clock cycles, wherein the required amount of the one or more shared resources is different than another amount of the one or more shared resources, wherein the other amount is required in order to grant the request during another one of the multiple clock cycles; and refraining from granting the request during the given clock cycle in response to determining that the required amount of the one or more shared resources is not available during the given clock cycle.

15. The method of claim 14, further comprising:

determining whether or not the different amount of the one or more shared resources is available during the other clock cycle; and granting the request during the other clock cycle in response to determining that the other amount of the one or more shared resources is available during the other clock cycle.

16. The method of claim 14, wherein said determining is dependent on one or more of:

a relative priority of the one of a plurality of potential requestors for receiving the given portion of one or more shared resources;

a special status of one or more of the plurality of potential requestors;

the one of the plurality of potential requestors from which the request was received; or the one of the plurality of potential requestors that was most recently granted the given portion of the one or more shared resources prior to receiving the request.

17. The method of claim 14, further comprising:

receiving a second request for the given portion of the one or more shared resources; and granting the second request;

wherein the clock cycle during which the second request is granted is dependent on one or more of:

which of the plurality of potential requestors the second request was received from; or which of the plurality of potential requestors was most recently granted the given portion of the one or more shared resources prior to receiving the second request.

18. A system, comprising:

a shared memory comprising a plurality of memory banks;

a plurality of requesting components, each configured to submit requests for at least a portion of the shared memory; and a memory allocation component configured to arbitrate accesses by the plurality of requesting components to the shared memory;

wherein to arbitrate accesses by the plurality of requesting components to the shared memory, the memory allocation component is configured to:

receive a request from one of the plurality of requesting components for one or more of the plurality of memory banks;

determine availability, during a given one of multiple clock cycles, of a required number of memory banks wherein the required number is required to be available in order to grant the request during the given clock cycle, wherein the required number of memory banks is greater than another number of memory banks, wherein the different number is required to be available in order to grant the request during a subsequent one of the multiple clock cycles;

grant the request during the given clock cycle in response to determining that the required number of memory banks are available during the given clock cycle;

determine, in response to the required number of memory banks not being available during the given clock cycle, whether or not the other number of memory banks are available during the subsequent clock cycle; and grant the request during the subsequent clock cycle in response to determining that the other number of memory banks are available during the subsequent clock cycle.

19. The system of claim 18, wherein the one of the plurality of requesting components comprises a special-purpose processor core;

wherein the memory allocation component is configured to allocate, to the special-purpose processor core prior to receiving the request for the one or more memory banks, a maximum number of the plurality of memory banks that are available to be granted to the special-purpose processor core, wherein the maximum number of the plurality of memory banks comprises the required number of memory banks required to be available in order to grant the request during the given clock cycle; and wherein to arbitrate accesses by the plurality of requesting components to the shared memory, the memory allocation component is configured to grant the request during the given clock cycle.

20. The system of claim 18, wherein the one of the plurality of requesting components comprises one of a plurality of direct access memory (DMA) controllers, each of which is a potential requestor for a single respective one of the plurality of memory banks; and wherein to arbitrate accesses by the plurality of requesting components to the shared memory, the memory allocation component is configured to refrain from granting the request during the given clock cycle.

\* \* \* \* \*

UNITED STATES PATENT AND TRADEMARK OFFICE
CERTIFICATE OF CORRECTION

| | |
|---|---|
| PATENT NO. | : 10,268,604 B2 |
| APPLICATION NO. | : 14/795389 |
| DATED | : April 23, 2019 |
| INVENTOR(S) | : Coddington |

It is certified that error appears in the above-identified patent and that said Letters Patent is hereby corrected as shown below:

In the Specification

In Column 16, Line 67, delete "between between" and insert -- between --, therefor.

Signed and Sealed this
Twenty-first Day of July, 2020

Andrei Iancu
*Director of the United States Patent and Trademark Office*